(12) United States Patent
Sunata

(10) Patent No.: US 7,286,145 B2
(45) Date of Patent: Oct. 23, 2007

(54) SYSTEM FOR DESCRIBING MARKUP LANGUAGE FOR MOBILE USE, AND INFORMATION PROCESSING APPARATUS AND PROGRAM FOR GENERATING DISPLAY CONTENT

(75) Inventor: Jin Sunata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 10/385,458

(22) Filed: Mar. 12, 2003

(65) Prior Publication Data
US 2003/0177444 A1   Sep. 18, 2003

(30) Foreign Application Priority Data
Mar. 13, 2002   (JP) .............................. 2002-068333

(51) Int. Cl.
*G09G 5/00* (2006.01)
(52) U.S. Cl. ...................... 345/660; 345/668; 345/671
(58) Field of Classification Search ................ 345/536, 345/864, 684, 668, 671, 660, 666, 619; 382/298, 382/240; 455/550.1, 344, 551, 566; 379/93.01–93.37, 379/93; 715/864, 866
See application file for complete search history.

(56) References Cited

U.S. PATENT DOCUMENTS

| | | | |
|---|---|---|---|
| 4,366,475 A * | 12/1982 | Kishi et al. ................. | 345/668 |
| 4,991,121 A * | 2/1991 | Minoura et al. ............. | 345/1.1 |
| 5,010,324 A * | 4/1991 | Yamamoto .................... | 345/684 |
| 5,880,740 A | 3/1999 | Halliday et al. ............ | 345/629 |
| 6,288,800 B1 | 9/2001 | Izumi ......................... | 358/468 |
| 6,351,599 B1 * | 2/2002 | Komeno ....................... | 345/721 |
| 6,674,439 B1 * | 1/2004 | Shin et al. .................. | 345/501 |
| 6,684,087 B1 | 1/2004 | Yu et al. ..................... | 455/566 |
| 6,714,205 B1 * | 3/2004 | Miyashita et al. .......... | 345/536 |
| 2002/0032699 A1 | 3/2002 | Edwards et al. ............ | 707/513 |
| 2003/0040341 A1 | 2/2003 | Casals ........................ | 455/566 |
| 2003/0077002 A1 * | 4/2003 | Silverstein et al. ......... | 382/298 |
| 2003/0123744 A1 * | 7/2003 | Chui et al. .................. | 382/240 |
| 2003/0135649 A1 * | 7/2003 | Buckley et al. ............. | 345/864 |

FOREIGN PATENT DOCUMENTS

| | | |
|---|---|---|
| EP | 0833492 | 4/1998 |
| JP | 2001-45407 | 2/2001 |
| JP | 2001-52154 | 2/2001 |
| JP | 2002-335570 | 11/2002 |

* cited by examiner

*Primary Examiner*—Kee M. Tung
*Assistant Examiner*—Chante Harrison
(74) *Attorney, Agent, or Firm*—Fitzpatrick, Cella, Harper & Scinto

(57) ABSTRACT

An image to be displayed is divided into partial images. The partial images are arranged so that they have the same positional relationships as operation keys of an image display apparatus. Operating an operation key causes an enlarged version of a partial image in a corresponding position to be displayed.

6 Claims, 12 Drawing Sheets

RELATIONSHIP BETWEEN THUMBNAIL IMAGES AND TEN-KEYS

NETWORK CONFIGURATION

MOBILE PHONE AND TEN-KEY UNIT

RELATIONSHIP BETWEEN ACCESSKEY ATTRIBUTE IN HTML AND TEN-KEYS

THUMBNAIL DISPLAY OF IMAGE

ENLARGED DISPLAY

RELATIONSHIP BETWEEN THUMBNAIL IMAGES AND TEN-KEYS

CONFIGURATION OF WEB SERVER COMPONENTS

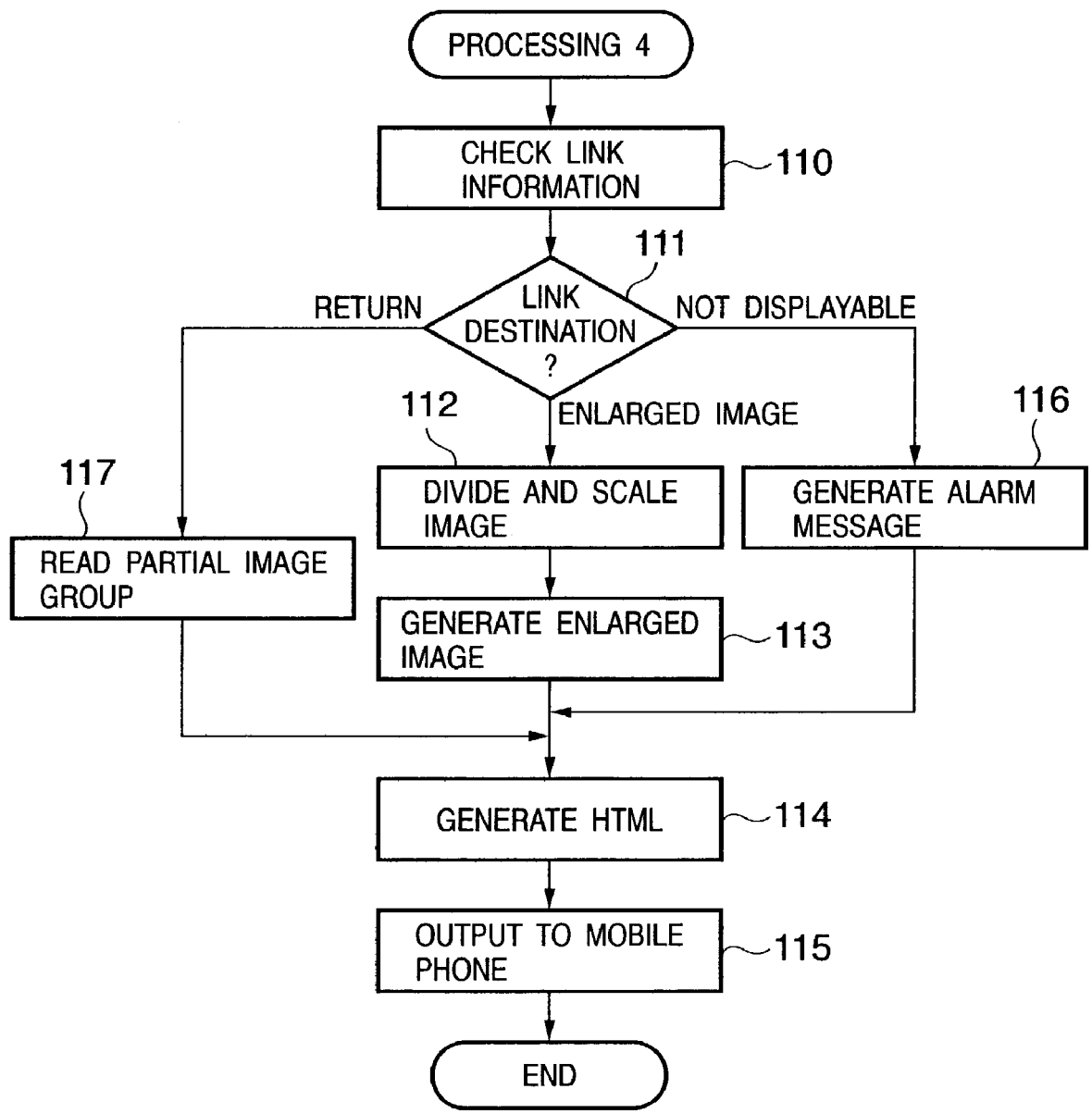

SYSTEM FOR DESCRIBING MARKUP LANGUAGE FOR MOBILE USE, AND INFORMATION PROCESSING APPARATUS AND PROGRAM FOR GENERATING DISPLAY CONTENT

FIELD OF THE INVENTION

This invention relates to a system for describing a markup language for mobile use, and an information processing apparatus and program for generating a display content.

BACKGROUND OF THE INVENTION

Today the Internet can be used through mobile phones.

Some browsers installed in commercially available mobile phones adopt HTML for mobile devices called COMPACT-HTML (COMPACT-HyperText Markup Language) established by W3C (World Wide Web Consortium), which establishes standards for the Internet.

In COMPACT-HTML, a ten-key number called an access key may be assigned to a link tag in HTML so that the link can be designated by a ten-key of the mobile phone. Designating a ten-key number allows jumping to a specific link in one key operation and eliminates the efforts to move a cursor key to a link position and to select the link with an OK button.

When an image display service is provided for a small information device such as a mobile phone having a COMPACT-HTML browser, a server has to reduce the size of an image to the mobile phone's display size and send the reduced image to the mobile phone.

However, the image reduced for display on a small display unit of the mobile phone may be hard to view due to the size reduction. Further, when a part of the image is interested in, the server has to generate an enlarged version of the whole image for enlarged display and send it to the mobile phone. Furthermore, the mobile phone has to again receive the whole image for enlarged display in order to display only a part of the image. This involves problems in various aspects, such as the time required for reception, a communication charge, communication resources, and memory resources, for the user who has to receive the whole enlarged image from the server although he wants to enlarge only a part of the image.

To solve these problems, it may be contemplated to specify the part to be enlarged and cause the server to enlarge only that part and send it to the mobile phone. However, the problems are that there is no way to specify the part to be enlarged, and that if the part is actually enlarged and displayed, it is hard to know which part of the original whole image is being displayed.

SUMMARY OF THE INVENTION

An object of the invention is to provide an intuitive and simple key operation for enlarged display of a part of an image, and to thereby enhance operability.

To realize these objects, according to an aspect of the present invention, an apparatus for outputting an image comprising dividing means for dividing an image so that one of partial images can be selected with a ten-key; and output means for outputting the one of the partial images selected with the ten-key, wherein the dividing means divides the image based on an image size and a screen size.

According to another aspect of the present invention, a method for outputting an image comprising the steps of dividing an image so that one of partial images can be selected with a ten-key; and outputting the one of the partial images selected with the ten-key, wherein the step of dividing comprises dividing the image based on an image size and a screen size.

According to another aspect of the present invention, an apparatus for outputting image data comprising dividing means for dividing an original image into partial images so that one of the partial images can be selected with a ten-key; and output means for outputting a first image data for displaying the one of the partial images selected with the ten-key, wherein the output means outputs a second image data for displaying the whole of the original data in response to a ten-key operation performed when the one of the partial images is displayed.

According to another aspect of the present invention, a method for outputting image data comprising the steps of dividing an original image into partial images so that one of the partial images can be selected with a ten-key; and outputting a first image data for displaying the one of the partial images selected with the ten-key, wherein the step of outputting comprises outputting a second image data for displaying the whole of the original data in response to a ten-key operation performed when the one of the partial images is displayed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a flowchart of an operation performed by the web server in the Second Embodiment of the invention.

DETAILED DESCRIPTION OF THE PREFERRED EMBODIMENTS

Now, embodiments of the invention will be described with reference to the drawings.

First Embodiment

Figure 1:
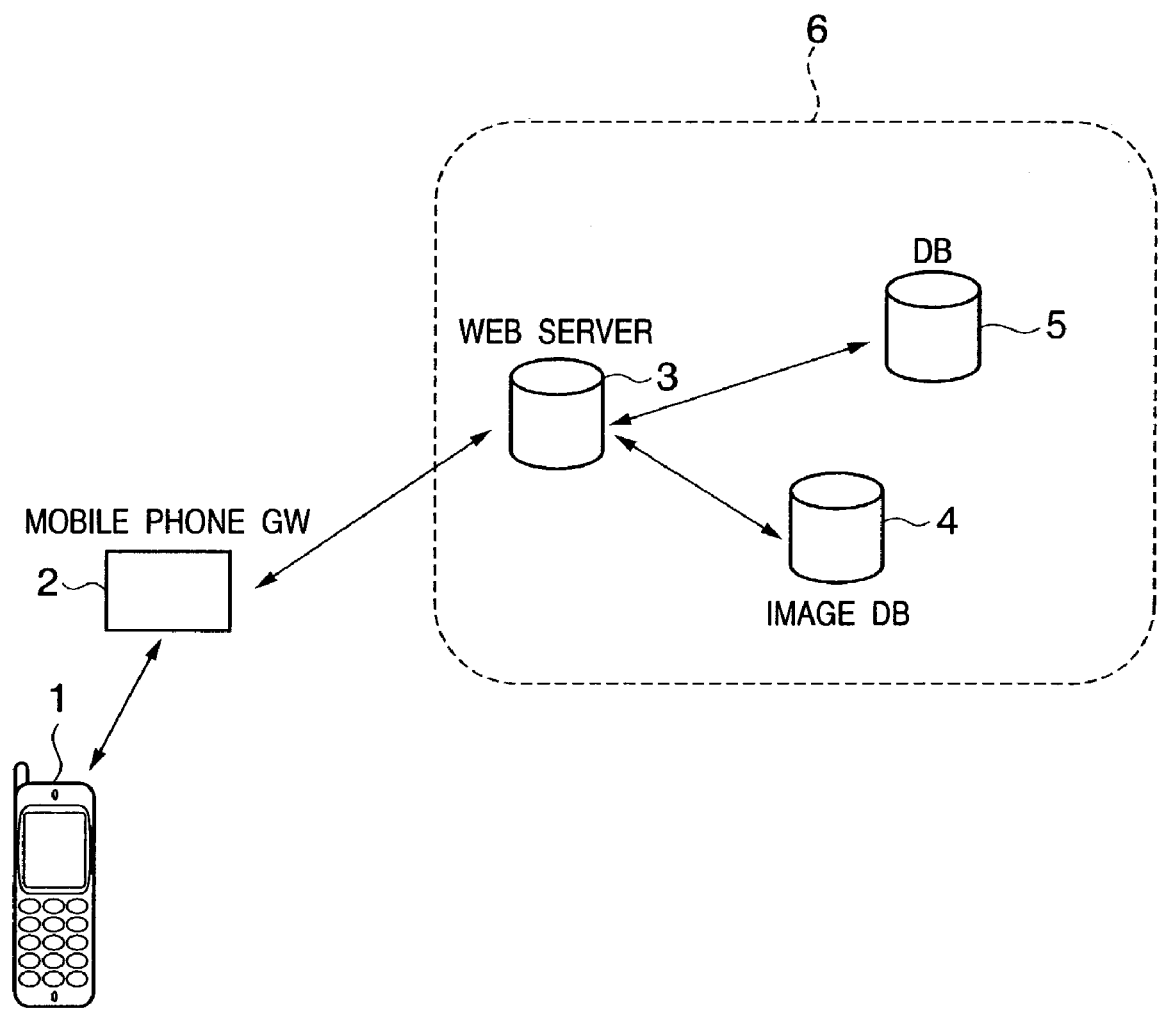
FIG. 1 shows a network configuration for describing an embodiment of the invention.

FIG. 1 is an overview of a network configuration adapted for describing the Fist Embodiment of the present invention.

In FIG. 1, the network is configured such that a mobile phone 1 can cooperate with a mobile phone gateway (referred to as a mobile phone GW hereafter) 2 to connect to a web service system 6. The mobile phone 1 has installed a mobile phone browser and is capable of displaying images. The mobile phone GW 2 is provided by telephone companies and enables the mobile phone 1 to connect to the Internet, private line services, and so on.

The web service system 6 includes a web server 3 on which applications can operate, a database (referred to as a DB hereafter) 5 that stores data required for web services, such as information on connectable devices and access authorization data, and an image database (referred to as an image DB hereafter) 4 that stores original images to be displayed on the mobile phone 1.

The mobile phone browser of the mobile phone 1 implements HTTP (HyperText Transfer Protocol) operable on TCP/IP (Transmission Control Protocol/Internet Protocol). The browser enables connection to the web server 3 and content display through the mobile phone GW 2.

Figure 2:
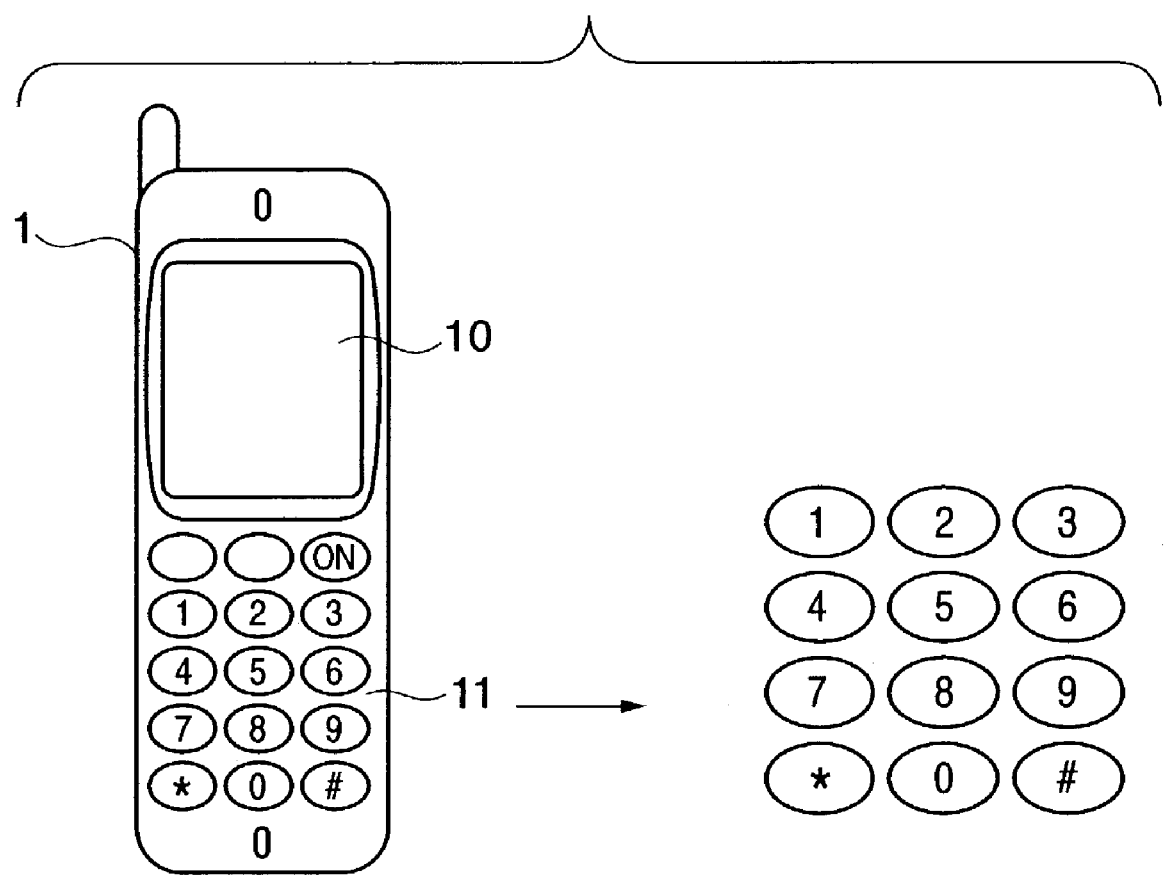
FIG. 2 shows a mobile phone and a ten-key unit used in describing the embodiment of the invention.

FIG. 2 schematically shows the mobile phone 1.

The mobile phone 1 has a display screen 10 capable of displaying information provided by the browser, and an alphanumeric ten-key unit 11 used for inputs of phone numbers, e-mail addresses, e-mail texts, and so on. The ten-key unit 11 includes minimum numeric keys 1 to 0 required for making calls, as well as pound and asterisk keys.

Figure 3:
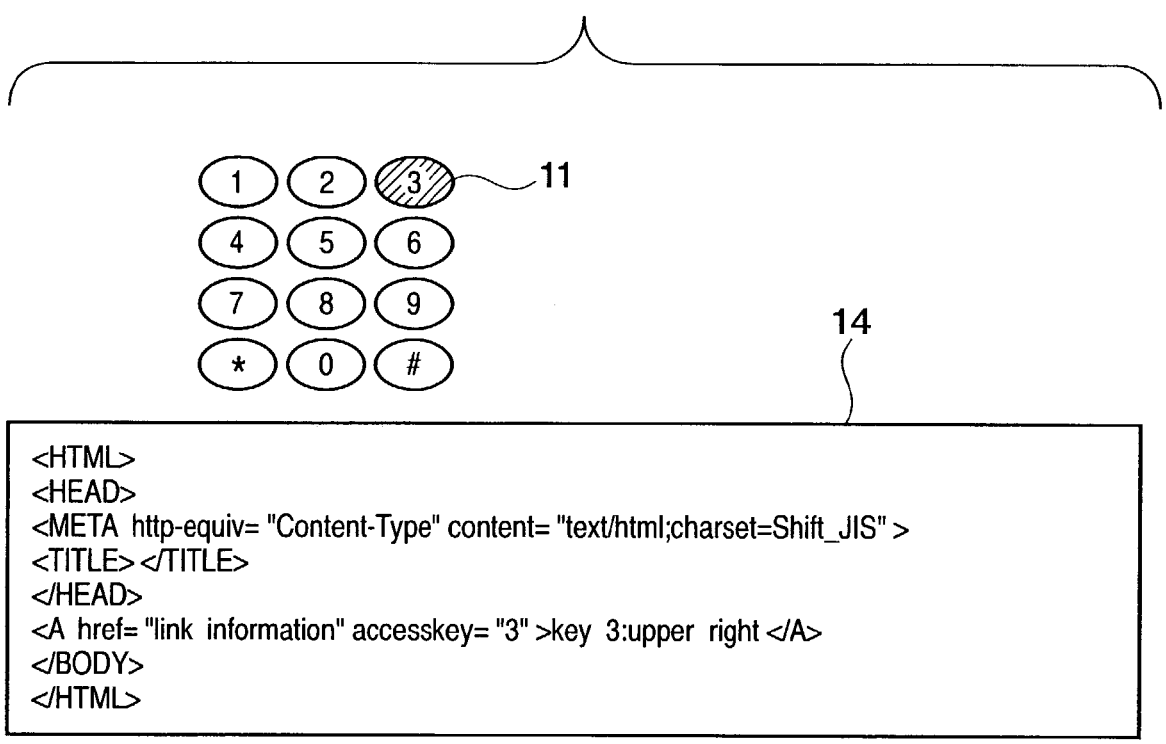
FIG. 3 describes a relationship between an accesskey attribute in HTML and ten-keys for describing the embodiment of the invention.

FIG. 3 describes a relationship between HTML and the ten-keys.

In the above-described HTML called COMPACT-HTML, an attribute called accesskey is available to reduce key operations on a device such as a mobile phone or a PDA (Personal Digital Assistant) used in a mobile environment. In COMPACT-HTML, describing the accesskey attribute in an available tag allows an operation for the tag to be performed simply with a press of a ten-key of a designated number.

An example of how to describe this will be described with the ten-keys 11 and a sample COMPACT-HTML 14.

When it is desired to jump to (select and display) a certain link destination, the accesskey attribute and a ten-key number to be designated may be described in the anchor tag for link information, <A HREF="link information">. As shown in FIG. 3, if the ten-key number to be used as an access key is "3" and the link destination is "link information", the tag is described as <A HREF="link information" ACCESS-KEY="3">.

In this manner, while the HTML page is displayed, a press of the key 3 in the ten-keys 11 provides a jump to the link information assigned to the access key "3".

By such a simple description, a press of a key can replace operations that would be performed for a browser operated on PC, such as the key operations of moving a cursor to a link and selecting it with a return key, or the mouse operations of selecting and clicking a link. Therefore, this is a convenient function for small devices with poor input interfaces.

How to actually use the access key in this embodiment will be described with reference to FIG. 4 and the following figures.

Figure 4:
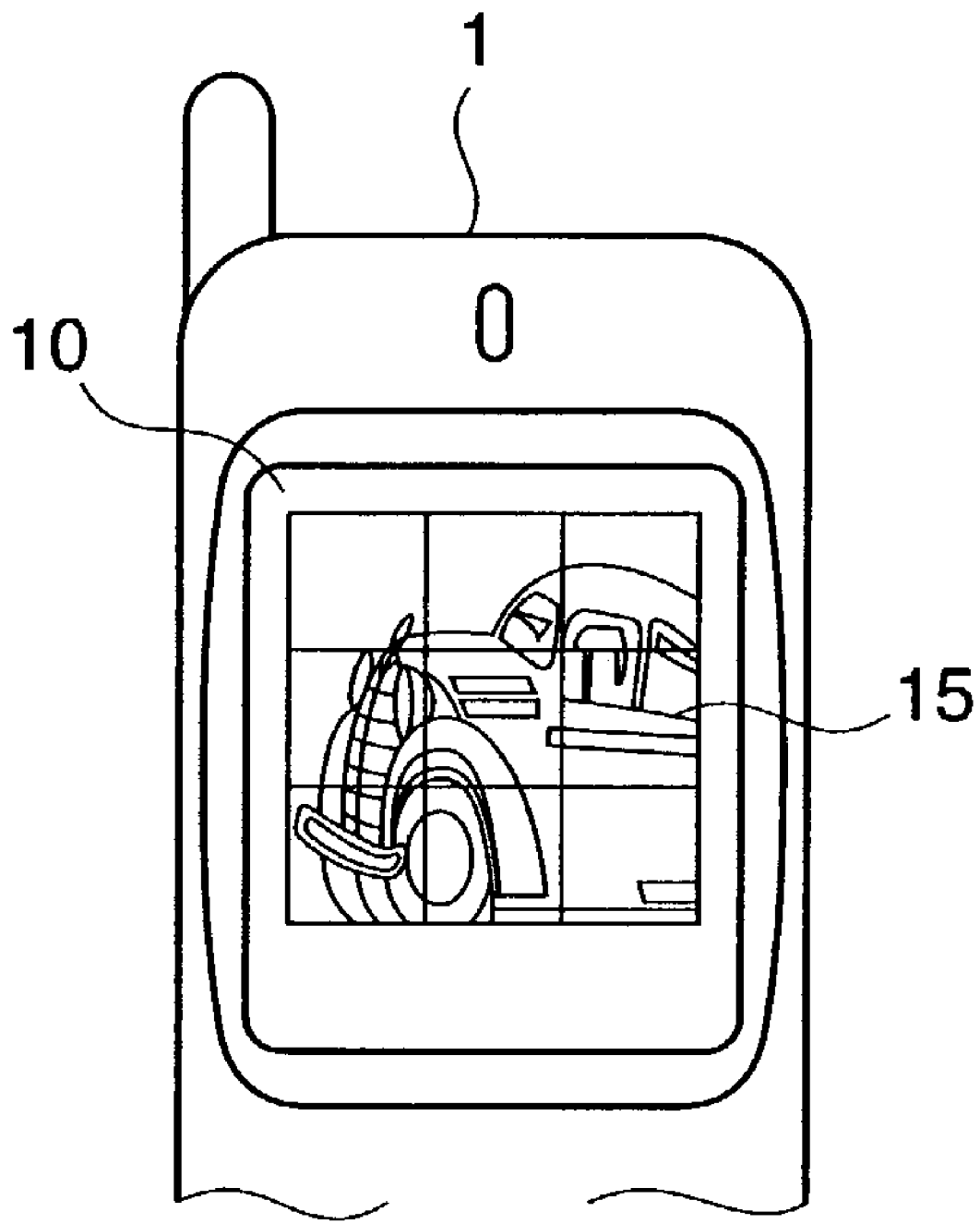
FIG. 4 shows an exemplary display of a partial reduced image group for an image in the embodiment of the invention.

FIG. 4 shows the display screen 10 of the mobile phone 1 displaying a group of partial images 15 aligned in the same way as the ten-keys 11. The partial image group 15 represents an original image divided into nine parts in the same arrangement as the keys "1" to "9" in the ten-keys 11 and scaled so that the whole image is displayed on the screen. The partial images are aligned by TABLE tags and displayed.

Figure 5:
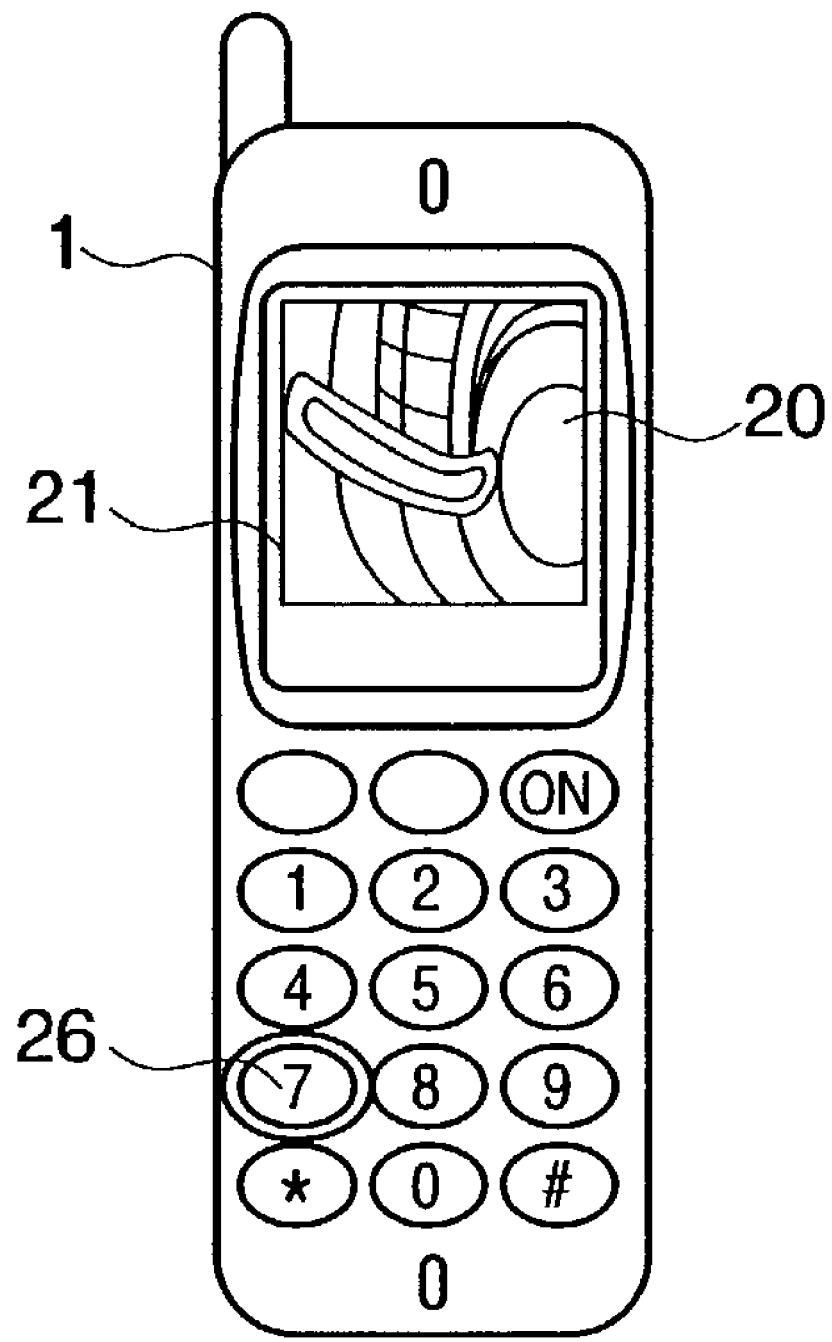
FIG. 5 shows an exemplary enlarged display of a partial image in the embodiment of the invention.

FIG. 5 shows an enlarged display of a certain image 20 in the partial image group 15 (in this embodiment, an image corresponding to the position "7" in the ten-keys 11). This image 20 is displayed with a press of the ten-key "7" (26).

Figure 6:
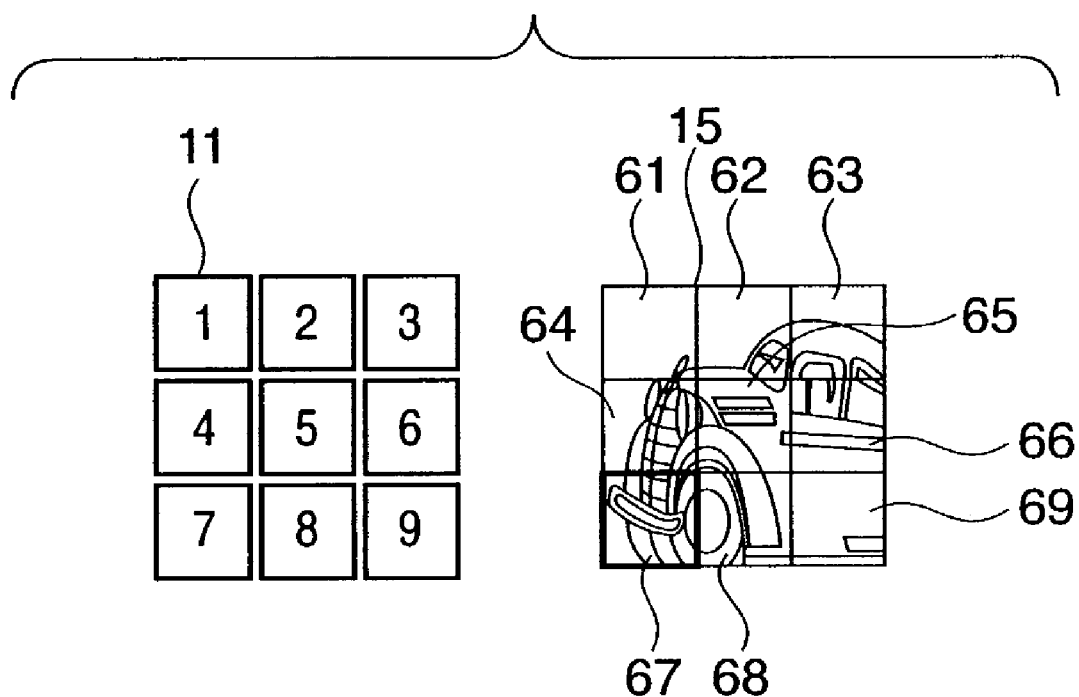
FIG. 6 shows relationships between partial reduced images and the ten-keys in the embodiment of the invention.

That is, as shown in FIG. 6, "1" in the ten-keys 11 is associated with a partial image 61 in the partial image group 15 as its access key. Similarly, "2" in the ten-keys 11 is associated with a partial image 62; "3" in the ten-keys 11 is associated with a partial image 63; "4" in the ten-keys 11 is associated with a partial image 64; "5" in the ten-keys 11 is associated with a partial image 65; "6" in the ten-keys 11 is associated with a partial image 66; "7" in the ten-keys 11 is associated with a partial image 67; "8" in the ten-keys 11 is associated with a partial image 68; and "9" in the ten-keys 11 is associated with a partial image 69. A press of each key causes an enlarged image of the corresponding partial image to be displayed on the display screen of the mobile phone 1 (see FIG. 5).

Figure 7:
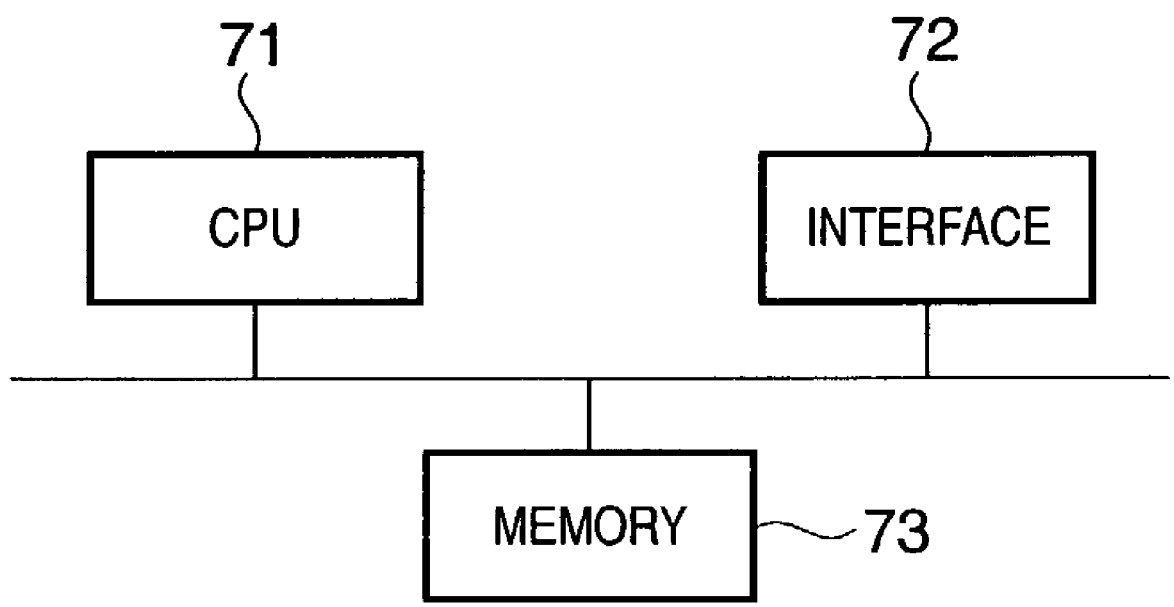
FIG. 7 shows a configuration of a web server in the embodiment of the invention.

FIG. 7 shows a hardware configuration of the web server 3. The web server 3 has a CPU 71, an interface 72, and memory 73. The CPU 71 is a computer that operates according to a program stored in the memory 73. The interface 72 communicates with the mobile phone GW 2 and the DBs 4 and 5.

Now the process flow will be described.

Figure 8:
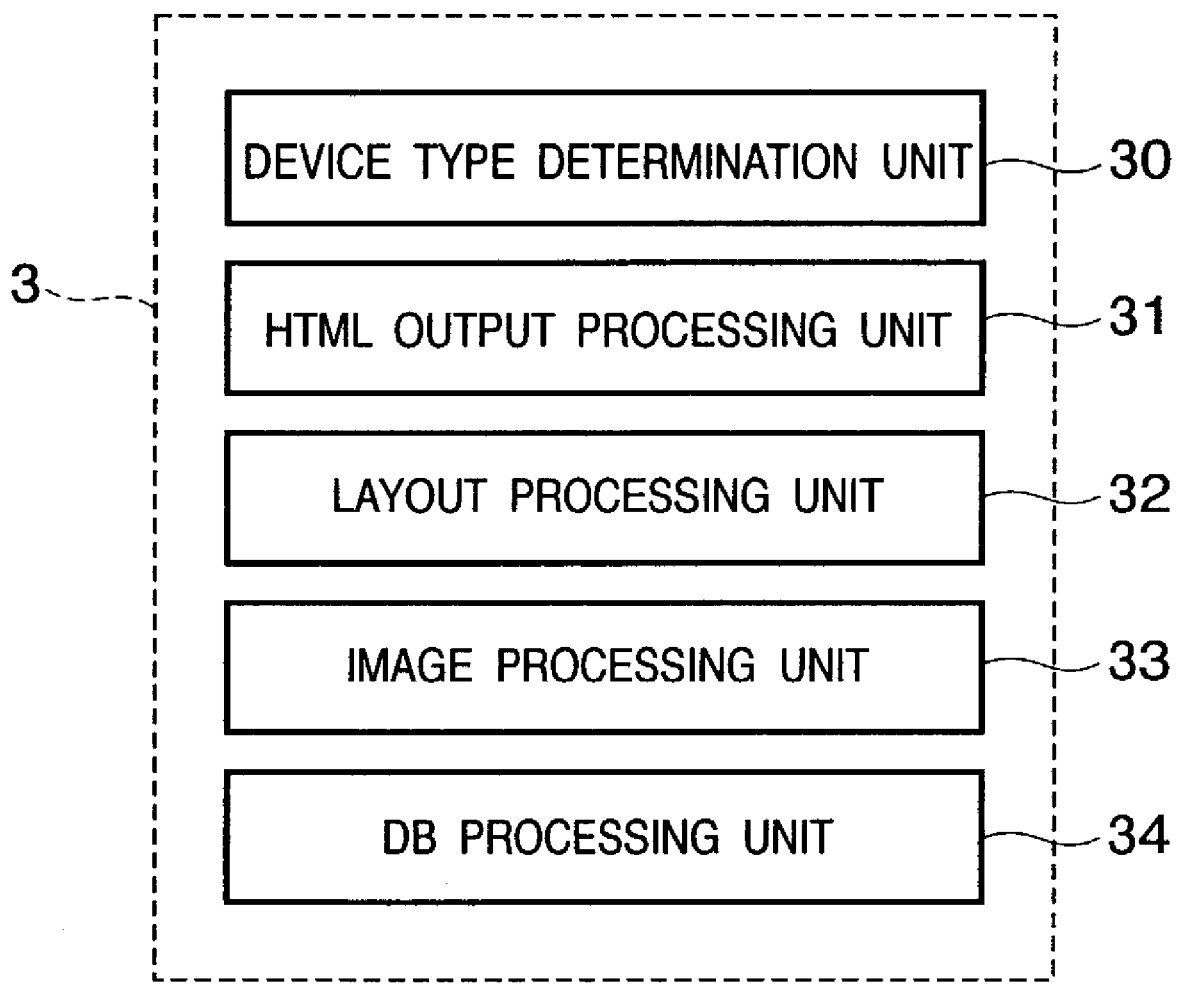
FIG. 8 shows a software configuration of the web server in the embodiment of the invention.

FIG. 8 shows a configuration of software (the program in the memory 73) in the web server 3 of the web service system 6. Like PC browsers, browsers installed in mobile devices have User-Agent information. When a mobile phone connects to the server, the server receives the User-Agent information from the mobile phone and obtains information about which type of device (or its browser) is connecting. Based on the obtained User-Agent information, the server determines the screen size or image format that allows for display on a display screen of the connecting mobile phone. The server also stores the obtained information as customizable information in the DB 5 and customizes the size of an image to be displayed. For example, the server scales the image so that its size does not exceed the screen size that allows for display on the display screen of the mobile phone.

Specifically, when the mobile phone 1 connects to the web server 3, a device type determination unit 30 obtains device type information from the User-Agent information sent from the mobile phone 1. Then, a layout processing unit 32 retrieves the size of the display screen of the connecting mobile phone 1 from information stored in the DB 5 through a DB processing unit 34. The layout processing unit 32 determines whether the size of an original image to be displayed on the mobile phone 1 matches the size of the display screen of the determined device type.

If it does not match, an image processing unit 33 divides the image into partial images corresponding to the arrangement of the keys "1" to "9" in the ten-keys 11. The image processing unit 33 also generates thumbnail images (referred to as partial reduced images hereafter) by reducing each of the obtained partial images, for example, to ⅑ of the display screen, so that all partial images are displayed on the display screen of the mobile phone. The layout processing unit 32 arranges the partial reduced images in the same way as the ten-keys 11. Then, the layout processing unit 32 generates HTML data in which corresponding keys in the ten-keys 11 are assigned to the partial reduced images as the access keys and provides the HTML data for the mobile phone 1 through an HTML output processing unit 31. Each of the obtained partial images is also scaled to the size of the display screen, and therefore partial images to be displayed in response to an enlargement operation by a ten-key (enlarged images) are generated. These enlarged images are defined as link destinations corresponding to the access keys assigned to the partial reduced images, and stored in memory (not shown) of the web server 3.

On the mobile phone 1, a group of the partial reduced images is displayed as shown in FIG. 4 based on the HTML provided by the web server 3. Then, the access keys may be used to display the enlarged images for the respective partial reduced images as shown in FIG. 5.

Figure 9:
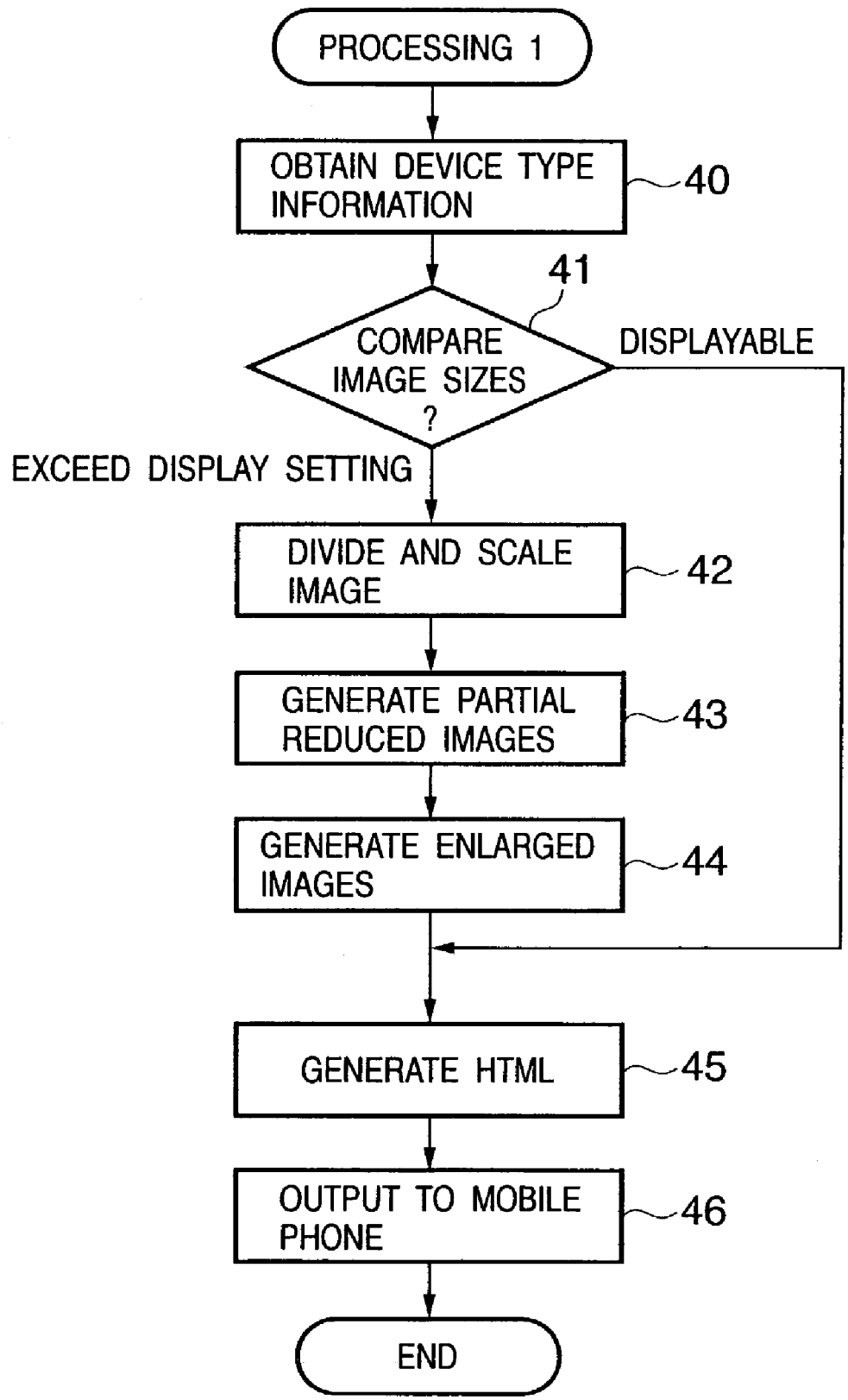
FIG. 9 is a flowchart of an operation performed by the web server in an First Embodiment of the invention.

The process in FIG. 8 will be described using a flowchart of FIG. 9. This flowchart represents a part of the program stored in the memory 73.

Processing 1 starts with access initiated by a mobile device such as the mobile phone 1.

In step 40, the device type determination unit 30 determines the device type of the accessing mobile phone 1. In step 41, based on the device type, the layout processing unit 32 performs comparison with the image size suitable for display.

If the comparison in step 41 shows that the size of an original image in the image DB 4 can be directly applied to the display screen of the mobile phone 1 (that is, if the original image is of the same size as or smaller than the display screen of the mobile phone 1), the process directly proceeds to step 45. In step 45, HTML data is generated without scaling of the original image. The generated HTML data is output to the mobile phone through the HTML output processing unit 31 (step 46). Here, the whole image is displayed by default, because the image does not need to be enlarged. If the original image is larger than the display screen of the mobile phone 1 but can fit into the display screen with a predetermined reduction in size (for example, a reduction percentage of 30% or more), it is reduced by that percentage.

If the comparison in step 41 shows that the original image is larger than the display area of the mobile phone 1 and would require a significant reduction to fit into the display area (for example, a reduction percentage of less than 30%), the image processing unit 33 converts the image into a form that fits into the display screen of the mobile phone 1 of the determined device type by dividing and scaling the image as described above (step 42). The image processing unit 33 generates a group of partial reduced images in step 43, and generates enlarged images for the partial reduced images and stores them in the memory 73 in step 44. Then in step 45, based on the generated partial reduced image group, the layout processing unit 32 generates HTML in which the partial reduced images are associated with the ten-keys as described above. The HTML output processing unit 31 outputs the HTML to the mobile phone 1 in step 46 and allows the mobile phone 1 to display the HTML.

Thus, the user can transfer to the enlarged images by selecting the ten-keys from 1 to 9 that have their positional relationships associated with the partial reduced images.

When generating the HTML in step 45, the layout processing unit 32 sets link destinations for keys that are not defined as the access keys for the partial reduced images (the keys "0", asterisk, and pound) to cause an alarm when pressed.

Figure 10:
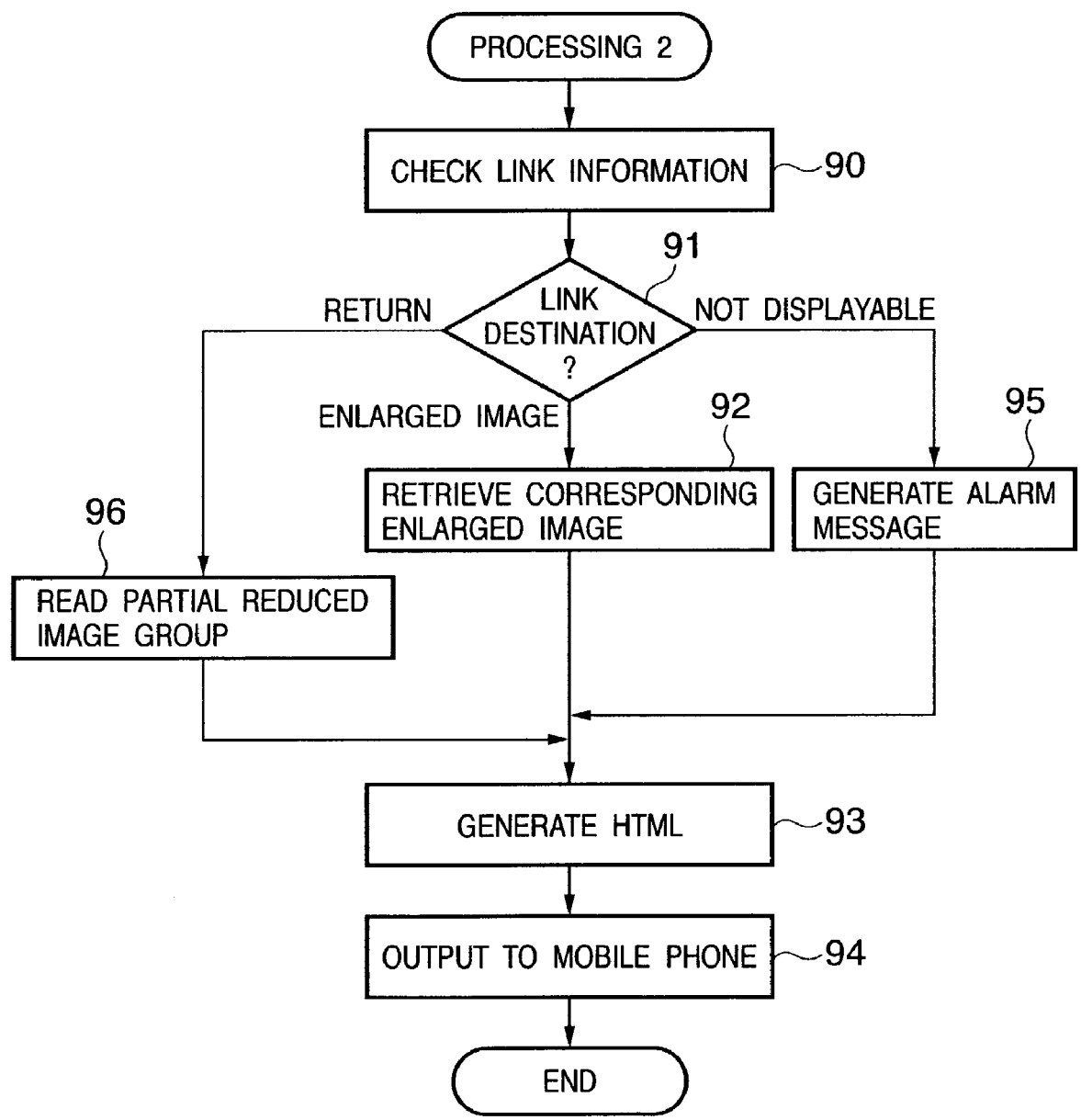
FIG. 10 is a flowchart of an operation performed by the web server in the First Embodiment of the invention.

FIG. 10 describes processing performed by the web server 3 when a ten-key is pressed while the partial reduced image group as shown in FIG. 4 or an enlarged image as shown in FIG. 5 is displayed on the mobile phone 1. This flowchart represents a part of the program stored in the memory 73.

When a certain ten-key is pressed on the mobile phone 1, information on a link destination assigned to the pressed ten-key is sent to the web server 3. The web server 3 checks the link information (step 90).

If the link destination for the link information checked in step 90 is an enlarged display image (if one of the keys "1" to "9" in the ten-keys 11 is pressed while the partial reduced image group is displayed, or if a key for causing display of another enlarged image is pressed while an enlarged image is displayed), a corresponding enlarged image is retrieved from the memory 73 (step 91, 92), and HTML is generated for displaying the enlarged image (step 93). The generation of the HTML for displaying the enlarged image includes defining the corresponding key number as the access key for displaying the partial reduced image group so that the display returns to the partial reduced image group when the same key is pressed again. The generated HTML is then output to the mobile phone 1 (step 94). While the enlarged image is displayed, the reduced image group is temporarily stored in the memory 73 for a quick return to the display of the reduced image group.

If the link destination for the link information checked in step 91 is a reduced image group because the same key is pressed again after an enlarged image is displayed on the mobile phone 1 (for example, if the key "1" is pressed again after the key "1" is pressed to display a corresponding enlarged image), the partial reduced image group temporarily stored in the memory 73 is read (step 91, 96). Then, HTML for displaying the partial reduced image group is generated (step 93) and output to the mobile phone 1 (step 94).

If an enlarged image corresponding to the link destination for the link information checked in step 91 cannot be displayed (for example, if the key "0", asterisk, or pound is pressed), an alarm message is generated for display along with the partial reduced image group (step 95). Then, HTML for displaying the alarm message along with the partial reduced image group is generated (step 93) and output to the mobile phone 1 (step 94).

Thus, according to this embodiment, if an original image to be displayed on the mobile phone is larger than the display screen of the mobile phone, the image is divided into partial images corresponding to the positional relationships among the ten-keys. Then, partial reduced images are generated from the partial images. The display screen of the mobile phone displays a group of the partial reduced images, to which the ten-keys are assigned respectively as the access keys for displaying corresponding enlarged images. This provides an intuitive and simple key operation for displaying the enlarged images for the partial reduced images, and thereby enhancing operability. Further, operation for returning to the display of the partial reduced image group is simple because it can be done only by pressing again a key used to display an enlarged image.

In addition, a press of a key that is not assigned to a partial image can be alarmed. This allows the user to easily know the keys that are not assigned to the partial images.

Second Embodiment

In the above First Embodiment, the partial reduced images and their enlarged images are generated and stored when the mobile phone accesses the web server. If the mobile phone requests display of an enlarged image by a ten-key operation, the enlarged image generated at the time of access by the mobile phone is displayed. In the Second Embodiment, only the partial reduced images are generated when the mobile phone accesses the web server, and the enlarged images are generated when the mobile phone requests them.

The network configuration for this embodiment is the same as in the First Embodiment and therefore will not be described.

Figure 11:
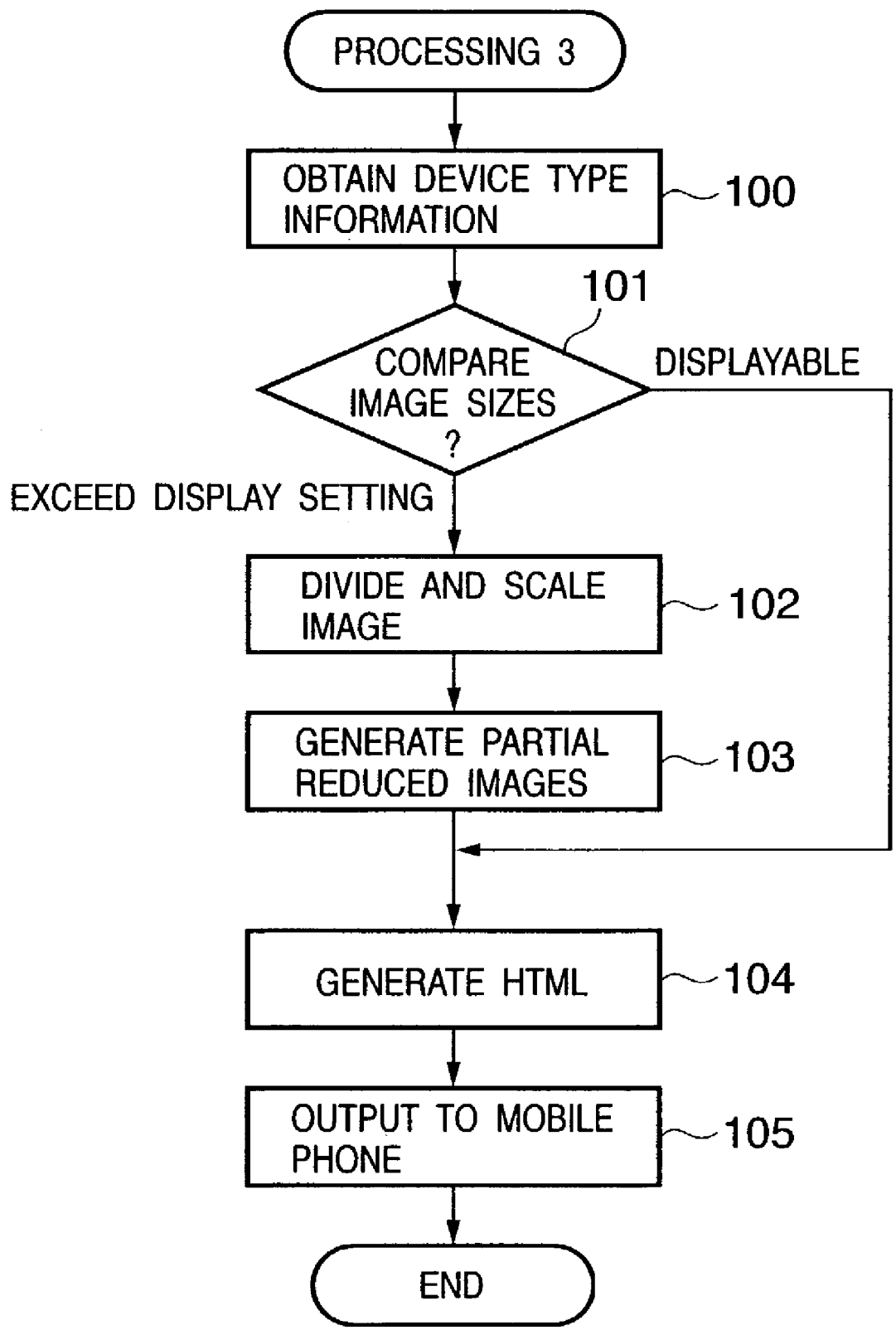
FIG. 11 is a flowchart of an operation performed by the web server in an Second Embodiment of the invention.

FIG. 11 is a flowchart showing processing performed when the mobile phone 1 accesses the web server 3 according to this embodiment. This flowchart represents a part of the program stored in the memory 73.

The processing 3 starts with access initiated by a mobile device such as the mobile phone 1.

When the mobile phone 1 accesses the web server 3, the device type determination unit 30 determines the device type of the accessing mobile phone 1 (step 100). Then, the layout processing unit 32 retrieves the size of the display screen of the connecting mobile phone 1 from the information stored in the DB 5 through the DB processing unit 34. The layout processing unit 32 compares the retrieved size of the display screen of the mobile phone 1 with the size of an original image in the image DB 4 and determines whether the size of the original image to be displayed by the mobile phone 1 matches the size of the display screen of the determined device type (step 101).

If the comparison shows that the size of the original image in the image DB 4 can be directly applied to the display screen of the mobile phone 1 (that is, if the original image is of the same size as or smaller than the display screen of the mobile phone 1), the process directly proceeds to step 104. In step 104, HTML data is generated without scaling of the image. The generated HTML data is output to the mobile phone through the HTML output processing unit 31 (step 105). Here, the whole image is displayed by default, because the image does not need to be enlarged. If the original image is larger than the display screen of the mobile phone 1 but can fit into the display screen with a predetermined reduction in size (for example, a reduction percentage of 30% or more), it is reduced by that percentage.

If the comparison in step 101 shows that the original image is larger than the display area of the mobile phone 1 and would require a significant reduction to fit into the display area (for example, a reduction percentage of less than 30%), the image processing unit 33 generates partial reduced images. The partial reduced images are generated by dividing the original image into partial images corresponding to the key arrangement of the ten-keys 11 and reducing each of the obtained partial images, for example, to ⅑ of the display screen, so that they fit into the display screen of the mobile phone 1 when arranged in the same way as the keys (step 102, 103). Then, the layout processing unit 32 arranges the partial reduced images in the same way as the ten-keys 11 and generates HTML data in which corresponding keys in the ten-keys 11 are assigned to the partial reduced images as the access keys and the partial reduced images are arranged in the same way as the ten-keys 11 (step 104). When generating the HTML in step 104, the layout processing unit 32 sets link destinations for keys that are not defined as the access keys for the partial reduced images (the keys "0", asterisk, and pound) to cause an alarm when pressed. The generated HTML is output to the mobile phone 1 through the HTML output processing unit 31 to allow the mobile phone 1 to display the partial reduced image group as shown in FIG. 4 (step 105).

Thus, the user can transfer to the enlarged images by selecting the ten-keys from 1 to 9 that have their positional relationships associated with the partial reduced images.

FIG. 12 describes processing performed by the web server 3 when a ten-key is pressed while the partial reduced image group as shown in FIG. 4 or an enlarged image as shown in FIG. 5 is displayed on the mobile phone 1. This flowchart represents a part of the program stored in the memory 73.

When a certain ten-key is pressed on the mobile phone 1, information on a link destination assigned to the pressed ten-key is sent to the web server 3. The web server 3 checks the link information (step 110).

If the link destination for the link information checked in step 110 is an enlarged display image (if one of the keys "1" to "9" in the ten-keys 11 is pressed while the partial reduced image group is displayed, or if a key for causing display of another enlarged image is pressed while an enlarged image is displayed), a corresponding partial image is extracted from the original image: the extracted partial image is scaled to the size of the display screen, and therefore an enlarged image is generated (step 111, 112, 113). Then, HTML is generated for displaying the generated enlarged image (step 114). The generation of the HTML for displaying the enlarged image includes defining the corresponding key number as the access key for displaying the partial reduced image group so that the display returns to the partial reduced image group when the same key is pressed again. The generated HTML is then output to the mobile phone 1 (step 115). While the enlarged image is displayed, the reduced image group is temporarily stored in the memory 73 for a quick return to the display of the reduced image group.

If the link destination for the link information checked in step 111 is a reduced image group because the same key is pressed again after an enlarged image is displayed on the mobile phone 1 (for example, if the key "1" is pressed again after the key "1" is pressed to display a corresponding enlarged image), the partial reduced image group temporarily stored in the memory 73 is read (step 111, 117). Then, HTML for displaying the partial reduced image group is generated (step 114) and output to the mobile phone 1 (step 115).

If an enlarged image corresponding to the link destination for the link information checked in step 111 cannot be displayed (for example, if the key "0", asterisk, or pound is pressed), an alarm message is generated for display with the partial reduced image group (step 116). Then, HTML for displaying the alarm message with the partial reduced image group is generated (step 114) and output to the mobile phone 1 (step 115).

Thus, according to this embodiment, only a required enlarged image is generated when it is to be displayed. Therefore, besides the advantages provided by the First Embodiment, this embodiment can provide reduction in the processing load on the web server. Further, the amount of a memory area to be used is reduced.

Other Embodiment

In the above description of the First Embodiment and Second Embodiment, returning from the display of an enlarged image to the display of the partial reduced image group is done by pressing the same key as the key pressed for displaying the enlarged image. On the other hand, in Other Embodiment, a key that is not used for designating an enlarged image (for example, the key "0", asterisk (*), or pound (#)) may be defined as the access key for returning to the partial reduced image group. In this case, pressing other keys that are not used for designating the enlarged images or the partial reduced image group causes an alarm message to be displayed.

In this manner, a common key can be used to return from any enlarged image part to the partial reduced image group.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for outputting, via a network, an image to a communication device having ten-keys and a display, comprising:
    a processor that executes a computer program; and
    a computer-readable storage medium on which is stored a computer program that, when executed by the processor, performs the steps of:
        a dividing step of dividing an image into partial images;
        a first generating step of generating first display information for displaying the partial images on the display of the communication device, wherein each one of the partial images is associated with one of the respective ten-keys of the communication device;
        a first providing step of providing the first display information to the communication device, wherein the communication device displays the partial images of the first display information on the display of the communication device;
        a receiving step of receiving, from the communication device, information concerning which one of the ten-keys of the communication device has been selected corresponding to one of the partial images displayed on the display of the communication device;
        a second generating step of generating second display information for displaying a resized version of the partial image associated with the selected one of the ten-keys, in which the selected one of the ten-keys is associated with the first display information; and
        a second providing step of providing, in response to the reception of the information concerning the selected one of the ten-keys by said receiving step, the second display information of the partial image associated with the selected one of the ten-keys to the communication device, wherein the partial image of the second display information is displayed by the communication device on the display,
    wherein, in a case where the receiving step receives second information concerning a selection of the same one of the ten-keys while the second display information is displayed on the display of the communication device, the first providing step repeats the provision of the first display information associated with the selected key to the communication device.

2. An apparatus according to claim 1, wherein, in the first display information, one of the ten-keys of the communication device is associated with link information to cause an alarm.

3. An apparatus according to claim 2, wherein if the selected one of the ten-keys of the communication device is associated with the link information to cause the alarm, said second generating step generates third display information for displaying the partial images with an alarm message on the communication device, and said second providing step provides the third display information to the communication device.

4. A method executed by an image processing apparatus for outputting, via a network from the image processing apparatus, an image to a communication device having ten-keys and a display, comprising the steps of:
    the image processing apparatus dividing an image into partial images;
    the image processing apparatus generating first display information for displaying the partial images on the display of the communication device, wherein each one of the partial images is associated with one of the ten-keys of the communication device;
    the image processing apparatus providing the first display information to the communication device, wherein the communication device displays the partial images of the first display information on the display of the communication device;
    the image processing apparatus receiving information concerning which one of the ten-keys of the communication device has been selected corresponding to one of the partial images displayed on the display of the communication device;
    the image processing apparatus generating second display information for displaying a resized version of the partial image associated with the selected one of the ten-keys, in which the selected one of the ten-keys is associated with the first display information; and
    the image processing apparatus providing to the communication device, in response to the reception of the information concerning the selected one of the ten-keys by said reception step, the second display information of the partial image associated with the selected one of the ten-keys, wherein the communication device displays the partial image of the second display information on the display of the communication device,
    wherein, in a case where the receiving step receives second information concerning a selection of the same one of the ten-keys while the second display information is displayed on the communication device, the first providing step repeats the provision of the first display information associated with the selected key to the communication device.

5. An image communication system for outputting an image by an image processing apparatus, via a network, to a communication device having ten-keys and a display,
    the image processing apparatus comprising:
        a processor that executes a computer program; and
        a computer-readable storage medium on which is stored a computer program that, when executed by the processor, performs the steps of:
            a dividing step of dividing an image into partial images;
            a first generating step of generating first display information for displaying the partial images on the communication device, wherein each one of the partial images is associated with one of the ten-keys of the communication device;
a first providing step of providing the first display information to the communication device;
a first receiving step of receiving information concerning which one of the ten-keys of the communication device has been selected corresponding to one of the partial images which are displayed on the display of the communication device;
a second generating step of generating second display information for displaying a resized version of the partial image associated with the selected one of the ten-keys, in which the selected one of the ten-keys is associated with the first display information; and
a second providing step of providing, in response to the reception of the information concerning the selected one of the ten-keys by said receiving step, the second display information to the communication device, and
the communication device comprising:
a processor that executes a computer program; and
a computer-readable storage medium on which is stored a computer program that, when executed by the processor, performs the steps of:
a second receiving step of receiving, from the image processing apparatus, the first display information generated by first generating unit of the image processing apparatus;
a first displaying step of displaying the partial images of the received first display information on the display of the communication device;
a detection step of detecting a selecting operation in which one of the ten-keys of the communication device associated with one of the displayed partial images is selected by a user;
a transmitting step of transmitting information concerning which one of the ten-keys of the communication device has been selected by the user to the image processing apparatus;
a third receiving step of receiving, from the image processing apparatus, the second display information generated by the second generating step of the image processing apparatus, which is provided by the second providing unit step of the image processing apparatus; and
a display controlling step that displays on the display of the communication device a resized version of the partial image corresponding to the selected one of the ten-keys, based on the second display information received by the receiving step, wherein, in a case where the first receiving step receives second information concerning a selection of the same one of the ten-keys while the second display information is displayed on the communication device, the first providing step repeats the provision of the first display information associated with the selected key to the communication device.

6. A computer readable storage medium on which is stored a computer readable program to be executed by an image processing apparatus, the program for outputting, via a network from the image processing apparatus, an image to a communication device having ten-keys and a display, the program comprising computer executable code that causes the image processing apparatus to execute the steps of:
dividing an image into partial images;
a first generating step of generating first display information for displaying the partial images on the display of the communication device, wherein each one of the partial images is associated with one of the ten-keys of the communication device;
a first providing step of providing the first display information to the communication device, wherein the communication device displays the partial images of the first display information on the display of the communication device;
receiving information concerning which one of the ten-keys of the communication device has been selected corresponding to one of the partial images displayed on the display of the communication device;
a second generating step of generating second display information for displaying a resized version of the partial image associated with the selected one of the ten-keys, in which the selected one of the ten-keys is associated with the first display information; and
a second providing step of providing to the communication device, in response to the reception of the information concerning the selected one of the ten-keys by said reception step, the second display information of the partial image associated with the selected one of the ten-keys, wherein the communication device displays the partial image of the second display information on the display of the communication device,
wherein, in a case where the receiving step receives second information concerning a selection of the same one of the ten-keys while the second display information is displayed on the communication device, the first providing step repeats the provision of the first display information associated with the selected key to the communication device.

* * * * *

UNITED STATES PATENT AND TRADEMARK OFFICE
CERTIFICATE OF CORRECTION

PATENT NO. : 7,286,145 B2
APPLICATION NO. : 10/385458
DATED : October 23, 2007
INVENTOR(S) : Sunata It is certified that error appears in the above-identified patent and that said Letters Patent is hereby corrected as shown below:

COLUMN 2:
Line 21, "the" should be deleted;
Line 60, "an" should read -- a --; and
Line 64, "an" should read -- a --.

COLUMN 11:
Line 28, "first" should read -- the first --; and
Line 45, "unit" should be deleted.

Signed and Sealed this

Tenth Day of June, 2008

JON W. DUDAS
*Director of the United States Patent and Trademark Office*